March 30, 1937.   R. P. KOEHRING   2,075,444
METHOD OF MAKING A BEARING MATERIAL
Filed Jan. 7, 1935

INVENTOR
Roland P. Koehring
BY
Spencer Hardman & Fehr
HIS ATTORNEYS

Patented Mar. 30, 1937

2,075,444

UNITED STATES PATENT OFFICE 2,075,444

METHOD OF MAKING A BEARING MATERIAL

Roland P. Koehring, Dayton, Ohio, assignor to General Motors Corporation, Detroit, Mich., a corporation of Delaware Application January 7, 1935, Serial No. 683

8 Claims. (Cl. 75—22)

This invention relates to seal rings or bearing materials which are especially suitable for sliding seals, such as the seal rings commonly used around the crank-shaft to seal the refrigerant gas within the crank-case of gas compressors for electric refrigerators. It is highly essential that such crank-case seals operate efficiently for a long period of time without attention of any kind, and that they provide a substantially perfect seal against the escape of the refrigerant gas both while the compressor is running and while it is idle. Hence highly important characteristics of such seal ring material is self-lubrication, minimum wear and absolute uniformity and smoothness of whatever wear that takes place, and above all a substantially perfect gas sealing contact against the relatively moving surface without the necessity of providing any great pressure contact between the seal ring and its contacting sliding surface.

The primary object of this invention is to provide a seal ring or a bearing material in general which has the above-mentioned desired qualities and properties.

A more specific object is to provide a bearing material comprising a base composition of a copper-tin bronze and having quite a large percentage of lead very uniformly and evenly distributed throughout the bronze base composition, the entire material being free of metal oxides to a very high degree.

Further objects and advantages of the present invention will be apparent from the following description, reference being had to the accompanying drawing, wherein a preferred embodiment of the present invention is clearly shown.

Figure 3:
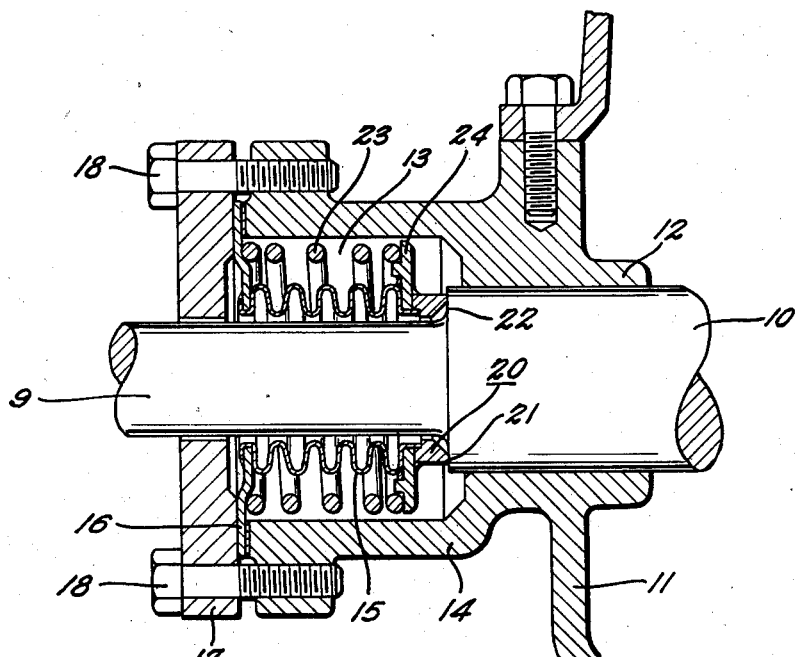
Fig. 3 is a section through a portion of a refrigerator compressor showing one end of the crank shaft projecting through the crank-case and the application of the seal ring of Figs. 1 and 2 to seal the gas within the crank-case of the compressor.
Figures 1, 2:
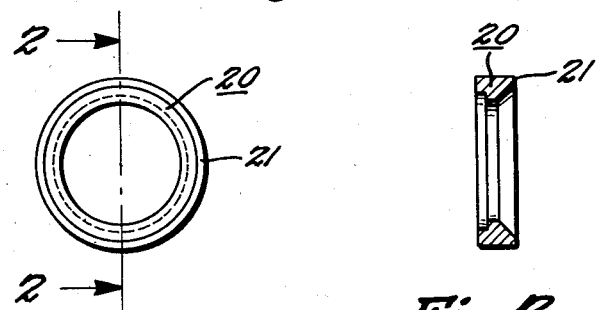
Fig. 1 is a face view of a refrigerator compressor seal ring which may be made of the bearing material of this invention.
Fig. 2 is a section on line 2—2 of Fig. 1.

Describing the structure shown in the drawing, 10 is the compressor crank shaft which projects through the crank-casing 11 and is supported upon a stationary bearing 12 of any suitable construction. Leakage of the refrigerant gas from the interior of the crank-case to the outside air or the inflow leakage of air to the crank-case when there is sub-atmospheric pressure therein cannot be effectively prevented by the main bearing 12 and hence a sliding seal arrangement must be provided to seal around the shaft 10 where it projects through the crank-case in order to be power driven by any external power means. The illustrated sealing means comprises a small chamber 13 formed by the walls 14 which are preferably integral with crank-case 11. A stationary metal bellows 15 surrounds the reduced portion 9 of shaft 10 and has its outer end fixed to the end plate 16 which in turn is clamped tightly against the open end of chamber 13 by the heavy end plate 17 and bolts 18. The inner end of bellows 15 has suitably fixed and sealed thereto the seal ring 20 which is made according to this invention and which is described in detail hereinafter. Seal ring 20 has a smooth ground face 21 which bears against the ground shoulder 22 of crank shaft 10 and thus seals against gas leakage, in or out, between the interior of the crank-case and the outside air. Coil spring 23 bears against the end plate 16 at one end thereof and against the spring retainer plate 24, suitably fixed to the inner end of bellows 15, at the other end thereof and thus serves to maintain the desired pressure contact between the non-rotating seal ring 20 and the rotating shaft shoulder 22. Bellows 15 and the coil compression spring 23 readily permit small axial movement of seal ring 20 as well as small angular movements thereof so that it will accommodate and move with any such small movements of shaft 10 in order to always provide plane to plane contact with the shoulder 22. It will now be clear that the only point where a sliding seal is necessary to seal the gas in the crank-case is the sliding contact between the seal ring 20 and the rotating shoulder 22.

This invention relates to the bearing material and the method of making same of which the seal ring 20 is made in order to give highly improved efficiency and long life in use.

Leaded bronzes have been looked upon with a great deal of favor for many years as a suitable material for bearings and many attempts have been made to prepare them with a satisfactory amount, dispersion, and even distribution of lead within the bronze body. The problem is made difficult by: (1) the great difference in the melting point of lead and that of copper or bronze; (2) the fact that lead will not alloy with copper or bronze but will always separate out into masses of pure lead upon cooling of the molten mixture; (3) the greater specific gravity of lead which causes the molten lead to tend to settle in any molten mixture with copper or copper-tin alloy and so prevent the desired uniformity of distribution of the lead within the bronze body. Hence the difficulties in obtaining even distribution and high uniformity in cast leaded bronzes containing high proportions of lead are obvious. This invention overcomes such difficulties and the leaded bronze material containing up to 50% by weight of lead obtained by the method described in detail below has proven far superior to any other known leaded bronze as a bearing material, particularly as a bearing material for a seal ring.

The following is given as an example in making the leaded bronze of this invention:

To a base mixture of 90 parts (by weight) of powdered copper and 10 parts of powdered tin there is added powdered lead (of a fineness of minus 200 mesh and plus 300 mesh) so that it constitutes 25% of the total weight, or in other words the total weight of metal powders consists of 67½% copper, 7½% tin and 25% lead. These metal powders are thoroughly mixed together, preferably with some lubricating material such as stearic acid, zinc stearate, or lubricating oil in order to facilitate the briquetting thereof, and then briquetted in suitable dies approximately to the desired final shape of the seal ring or other bearing. The briquetting pressure used should be low when compared to such briquetting pressures commonly used in making porous bronze bearing materials from powdered metals. Preferably the briquetting pressure should be sufficient to give a density in the briquette of about 6.90 grams per cm. for the above formula or only about 20,000 lbs. per square inch for the form of seal rings shown in the drawing in order to prevent defects hereinafter described. The briquettes thus formed are sintered for a period of from 20 to 30 minutes at about 1500° F. in a reducing atmosphere formed by the combustion of 1 part of natural gas and 5½ parts of air and from which the resultant water vapor has been removed to such an extent that said reducing atmosphere contains only about three-tenths of a pound of water to 1000 cu. ft.

The accurate preparation and removal of the water vapor and the continuous control of this reducing atmosphere is highly important in order to obtain the most efficient results and long effective life of the seal rings produced by this method. When 5½ parts of air is incompletely burned with 1 part of the natural gas used by applicant there results a mostly nitrogen gas containing about 7% each of $CO_2$, CO, and hydrogen, and a considerable amount of water vapor which must be removed by refrigeration prior to the use of this gas as the sintering atmosphere for the briquettes described above. Any suitable combustion unit may be used which may be accurately regulated to burn a measured quantity of fuel gas with a measured quantity of air. The products of combustion from the combustion unit are then passed through a refrigerated cooling unit and reduced to a temperature of about 38° F. and given sufficient time for the contained water vapor to condense out upon the cold surfaces of the cooling unit until there remains only about .3 lb. of water vapor in 1000 cu. ft. of the products of combustion. Such dried products of combustion are then reheated to form the reducing atmosphere in which the briquettes are sintered as described above. I have found by various experiments that when the water vapor is removed from such reducing atmosphere only to such extent that there remains 1 lb. of water to 1000 cu. ft. of gas that the seal rings sintered therein were not nearly so satisfactory as when the water vapor was reduced to .3 lb. per 1000 cu. ft. of gas. I have only theories as to just why this is so, but the facts are that when the water vapor content exceeds the above-mentioned limit the seal rings produced by this method are not uniformly satisfactory. The presence of a greater content of water vapor in the sintering atmosphere seems to facilitate the formation of oxides of lead which when present destroy the sealing properties of the sealing material in use by causing the sliding sealing surface to gall and then leak gas.

During the sintering operation the copper and tin completely alloy together to form a bronze according to the proportions of copper and tin ingredients used in the formula. The evenly dispersed lead particles completely melt but the molten lead does not segregate into larger masses nor sweat out of the briquette nor does it settle to the bottom thereof but remains uniformly and finely dispersed throughout the mass in its molten condition. Due to the complete or substantially complete absence of metal oxides and the fluxing effect of the reducing atmosphere the molten lead will readily wet and adhere to the still solid copper particles and be thereby held in place in fine uniform dispersion throughout the mass. The tin particles will fuse and completely dissolve into the copper particles since copper has a preferential affinity over lead for the tin present, which results in a bronze matrix with the molten lead still held in place by the above-described wetting action. Upon cooling at the end of the sintering operation the molten lead again solidifies and separates out into fine irregular shaped particles of pure lead but it nevertheless remains very evenly distributed throughout the bronze matrix and such lead particles still retain their surface adherence to the bronze matrix, that is to say, the lead particles in the final material are not merely held locked in place mechanically by the surrounding bronze matrix.

I have found that if the usual high briquetting pressure, such as 40,000 lbs. per square inch, be used in the above method the density of the briquette will be too great for best results. When such high briquetting pressures are used, I have found that during the sintering operation above described the molten lead will sweat out of the briquette and form in globules at its surface. This resultant unevenness of distribution of the lead is a defect in itself, but a further defect occurs due to the fact that as the molten lead flows through the pores of the briquette it dissolves a considerable part of the molten tin in its path and thus concentrates this dissolved tin in local spots on the briquette surface. Such action necessarily results in local spots richer in tin on the final sintered article and the entire mass is therefore not homogeneous in either lead or tin. I have found that a further advantage of relatively low pressure briquetting in this method lies in the fact that when only 20,000 lbs. per square inch is used the resultant briquette has sufficient porosity to permit the surrounding reducing atmosphere during sintering to readily enter the pores of the briquette and thus reduce all metallic oxides which possibly may be present and otherwise facilitate a more perfect wetting of the copper and tin particles with the molten lead as described above.

After sintering as above described the leaded bronze blank still has considerable porosity, and if left exposed to the air for several hours an appreciable increase in dimensions and weight will occur and the finished and machined seal ring will fail in a short time. I have discovered that such increase in weight and dimension and resultant bad effects is due to the very rapid oxidation of the lead in the material. I have also discovered that such oxidation can be prevented by soaking the sintered blank in a mixture of half kerosene and half light mineral oil as soon as it comes from the sintering furnace, after which it may be kept indefinitely without damage from such contact with air. However such a blank cannot be properly sized to the required density for seal rings by compressing same in accurately formed sizing dies when it is impregnated with oil.

Therefore when making seal rings out of this material the oil-impregnated blanks are again heated to about 500° F. in a slightly reducing atmosphere until the oil is all dried out after which they are immediately sized to the desired density (about 15% volume reduction in the above example) in any suitable sizing dies and then recoated with oil to protect same from the air until their final finishing operations. The sized blanks are then machined to accurate size if desired, and the contact surface 22 made smooth and they are then ready to be soldered or otherwise fixed to the bellows assembly shown in Fig. 3. Any ordinary oil lubrication during use will effectively prevent oxidation of the lead content in the rings during use.

In the above example only 25% of the total metal weight is lead but very much higher percentages of lead, for instance 50% lead, may be incorporated and uniformly finely distributed throughout a bronze matrix by the method hereinabove described. Also obviously any lower percentage of lead may be readily incorporated uniformly in the bronze matrix by this method since the lower the percentage of lead the less tendency there is for the lead to sweat out of the briquette during sintering. Also instead of using a bronze matrix having 90 parts copper to ten parts tin as in the example described in detail above, the lead content may be similarly incorporated in any other matrix of well known bearing bronze or brass or other bearing metals by this method. The desired kind of matrix in any given case is determined by the metal powder ingredients and percentages other than the lead ingredient. For instance, if a phosphor bronze matrix is desired, phosphor tin powder (2% phosphorus) may be simply substituted in whole or in part for the regular tin powder and the same method used. Obviously the matrix to be used in any particular case will be governed by the particular use to which the bearing material is to be put. The important feature of the bearing metal of this invention is the uniformity and fine distribution of the lead particles throughout the matrix regardless of the large percentages of lead which may be used. Various experiments have clearly shown that bearing metals having a quite large percentage of lead particles very finely and uniformly distributed throughout the interstices of the matrix are highly efficient as bearing metals in general and as sliding seals in particular.

While the embodiment of the present invention as herein disclosed, constitutes a preferred form, it is to be understood that other forms might be adopted, all coming within the scope of the claims which follow.

What is claimed is as follows:

1. The process of making a bearing material, comprising: briquetting a mixture of finely divided copper and tin in bronze-forming proportions together with finely divided lead at a pressure less than 40,000 lbs. per square inch so as to still leave considerable porosity in the briquette, sintering the briquette in an accurately controlled and dried reducing atmosphere containing substantially less than one pound water vapor per 1000 cubic feet to a temperature far above the melting point of lead and causing the copper and tin ingredients to alloy and form a bronze matrix and the lead to melt and flow through the voids in the briquette and thoroughly wet the surfaces of the bronze matrix and be thereby held in place by adhesion within the interstices in the matrix during sintering, then cooling the briquette in a reducing atmosphere until the lead solidifies in place without sweating out of the briquette, then immediately sealing the pores of the briquette with oil or other substance to prevent air entering the pores thereof and causing a rapid oxidation of the lead while in its activated condition.

2. The process of making a bearing material, comprising: briquetting a mixture of finely divided copper and tin in bronze-forming proportions together with finely divided lead at a pressure less than 40,000 lbs. per square inch so as to still leave considerable porosity in the briquette, sintering the briquette in an accurately controlled and dried reducing atmosphere containing substantially less than one pound of water vapor per 1000 cubic feet to a temperature far above the melting point of lead and causing the copper and tin ingredients to alloy and form a bronze matrix and the lead to melt and flow through the voids in the briquette and thoroughly wet the surfaces of the bronze matrix and be thereby held in place by adhesion within the interstices in the matrix during sintering, then cooling the briquette in a reducing atmosphere until the lead solidifies in place without sweating out of the briquette, and subsequently highly compressing the briquette in suitable dies to such a degree as to substantially close all the pores therein in order to exclude the air from entering therein and causing oxidation of the lead.

3. The process of making a bearing material, comprising: briquetting a mixture of finely divided copper and tin in bronze-forming proportions together with finely divided lead at a pressure less than 40,000 lbs. per square inch so as to still leave considerable porosity in the briquette, sintering the briquette in an accurately controlled and dried reducing atmosphere containing substantially less than one pound of water vapor per 1000 cubic feet to a temperature far above the melting point of lead and causing the copper and tin ingredients to alloy and form a bronze matrix and the lead to melt and flow through the voids in the briquette and thoroughly wet the surfaces of the bronze matrix and be thereby held in place by adhesion within the interstices in the matrix during sintering, then cooling the briquette in a reducing atmosphere until the lead solidifies in place without sweating out of the briquette, and subsequently highly compressing the briquette to such a degree as to form a substantially solid body.

4. The process of making a bearing material, comprising: briquetting a mixture of finely divided copper and tin in bronze-forming proportions together with finely divided lead at a pressure less than 40,000 lbs. per square inch so as to leave considerable porosity in the briquette, sintering the briquette in an accurately controlled and dried reducing atmosphere containing less than one pound of water vapor per 1000 cubic feet to a temperature far above the melting point of lead and causing the copper and tin ingredients to alloy and form a bronze matrix and the lead to melt and flow through the voids in the briquette and thoroughly wet the surfaces of the bronze matrix and be thereby held in place by adhesion within the interstices in the matrix during sintering, then cooling the briquette in a reducing atmosphere until the lead solidifies in place without sweating out of the briquette, then immediately sealing the pores of the briquette with oil or other substance to prevent air entering the pores thereof and causing a rapid oxidation of the lead while in its activated condition, subsequently removing the pore-sealing material from the briquette by evaporation, and then highly compressing the briquette to such a degree as to substantially close all the pores thereof.

5. The process of making a bearing material, comprising: briquetting a mixture of finely divided copper and tin in bronze-forming proportions together with finely divided lead at a pressure less than 40,000 lbs. per square inch so as to still leave considerable porosity in the briquette, sintering the briquette in an accurately controlled and dried reducing atmosphere containing less than one pound of water vapor per 1000 cubic feet to a temperature far above the melting point of lead and causing the copper and tin ingredients to alloy and form a bronze matrix and the lead to melt and flow through the voids in the briquette and thoroughly wet the surfaces of the bronze matrix and be thereby held in place by adhesion within the interstices in the matrix during sintering, then cooling the briquette in a reducing atmosphere until the lead solidifies in place without sweating out of the briquette, then preventing access of atmospheric air or moisture to the activated sintered porous briquette by sealing the pores with oil or the like, and subsequently removing the pore-sealing material and highly compressing the briquette to such a degree as to permanently exclude the entrance of air into the pores thereof.

6. The steps in the process of making a porous bronze matrix having a large percentage of lead evenly distributed thru said matrix, comprising: compressing a mixture of finely divided powder of bronze-forming metals and from 20% to 50% of finely divided lead powder at a pressure less than 40,000 lbs. per square inch to such relatively low briquette density as to leave sufficient porosity in the compacted material for reducing gases to readily enter the pores even after said lead content is fully melted during sintering of said compacted material, sintering said compacted material at a temperature above the melting point of lead in a substantially dry reducing atmosphere containing not more than half a pound of water vapor per 1000 cu. ft. and thereby causing the bronze-forming powders to alloy and form a porous bronze matrix and the lead powder to melt but remain within the pores of said matrix by a wetting adherence of the molten lead to the matrix, then cooling the sintered compacted material in a reducing atmosphere until the lead solidifies in place therein without sweating out, then sealing the pores of the material.

7. The steps in the process of making a porous bronze matrix having a large percentage of lead evenly distributed thruout the matrix, comprising: compressing a mixture of finely divided powder of bronze-forming metals and lead powder forming from 20% to 50% of the total metal powder at a pressure less than 40,000 lbs. per square inch to such low briquette density as to provide considerable remaining porosity in the briquette after the high lead content expands upon subsequent melting without sweating out of said briquette, sintering said briquette in a dried reducing atmosphere containing not more than a half pound of water vapor per 1000 cubic feet at a temperature above the melting point of lead and causing the bronze-forming powders to alloy and form a porous bronze matrix and the high lead content to melt but remain within the pores in said bronze matrix by a wetting adherence of the molten lead to the matrix, then cooling the sintered briquette in a reducing atmosphere until the lead solidifies in place therein without sweating out, then immediately sealing the pores of the briquette to prevent entrance of air therein and consequent rapid oxidation of the lead while in activated condition.

8. The steps in the process of making a porous bronze matrix having a large percentage of lead evenly distributed thruout the matrix, comprising: compressing a mixture of finely divided powder of bronze-forming metals and lead powder forming from 20% to 50% of the total metal powder at a pressure less than 40,000 lbs. per square inch to such low briquette density as to provide considerable remaining porosity in the briquette after the high lead content expands upon subsequent melting without sweating out of said briquette, sintering said briquette in a reducing atmosphere formed by an incomplete combustion of gas and air and from which the water vapor of combustion has been removed to such extent that said reducing atmosphere contains not more than a half pound water vapor per 1000 cubic feet, said sintering causing said bronze-forming powders to alloy and form a porous bronze matrix and causing said lead powder to melt but remain within the pores of said bronze matrix by a wetting adherence of the lead to the bronze, then cooling the sintered briquette in a reducing atmosphere until the lead solidifies in place therein without sweating out.

ROLAND P. KOEHRING.